United States Patent
Ogawa (10) Patent No.: US 9,160,053 B2
(45) Date of Patent: Oct. 13, 2015

(54) ICING AND SNOW ACCRETION PREVENTIVE INSULATOR, ELECTRIC WIRE, AND ANTENNA, METHOD FOR MANUFACTURING THEM, AND TRANSMISSION LINE TOWER USING THEM

(75) Inventor: Kazufumi Ogawa, Awa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1221 days.

(21) Appl. No.: 12/600,140

(22) PCT Filed: May 13, 2008

(86) PCT No.: PCT/JP2008/058783
§ 371 (c)(1),
(2), (4) Date: Nov. 13, 2009

(87) PCT Pub. No.: WO2008/143068
PCT Pub. Date: Nov. 27, 2008

(65) Prior Publication Data
US 2010/0225546 A1   Sep. 9, 2010

(30) Foreign Application Priority Data
May 14, 2007   (JP) .................. 2007-127573

(51) Int. Cl.
*H01Q 1/02* (2006.01)
*H01B 7/282* (2006.01)
(Continued)

(52) U.S. Cl.
CPC ............... *H01Q 1/02* (2013.01); *H01B 7/2825* (2013.01); *H01B 19/04* (2013.01); *H02G 7/16* (2013.01)

(58) Field of Classification Search
CPC ........ B05D 5/083; H01Q 1/01; H01B 7/2825; H01B 19/04; H02G 7/16
USPC ........................................................ 343/704
See application file for complete search history.

(56) References Cited

U.S. PATENT DOCUMENTS 4,210,687 A * 7/1980 Obendorf et al. ............ 428/34.7
5,324,566 A * 6/1994 Ogawa et al. ................. 428/141
(Continued)

FOREIGN PATENT DOCUMENTS

EP   1 479 738 A1   11/2004
EP   1 640 419 A1   3/2006
(Continued)

OTHER PUBLICATIONS

International Search Report for PCT/JP2008/058783 mailed Aug. 19, 2008. (English Translation Attached).
(Continued)

*Primary Examiner* — Dameon E Levi
*Assistant Examiner* — Jennifer F Hu
(74) *Attorney, Agent, or Firm* — Foley & Lardner LLP (57) ABSTRACT

Conventional chemisorption films use only a chemical bond between an adsorbent and a flat base material surface and thus have a problem that the contact angle of water droplets is about 120 degrees at the highest and, thus, water-repellent, oil-repellent and anti-fouling properties and water take-off properties are unsatisfactory for spontaneous removal of water droplets and dirt as in a lotus leaf. This invention provides an icing and snow accretion preventive insulator, electric wire and antenna. They are manufactured by a method characterized by comprising at least the step of forming a fine particle fusion film on the surface of a base material, the step of coating a fine particle liquid, prepared by dispersing fine particles in a solvent which does not dissolve the film, and drying the coating, the step of firing, the step of removing, by washing, fine particles not fused to the film, and the step of forming a water-repellent, oil-repellent and anti-fouling film. Alternatively, they may be manufactured by a method characterized by comprising at least the step of coating a fine particle liquid, prepared by dispersing fine particles in a solvent, onto the surface of a base material and drying the coating, the step of firing, the step of removing, by washing, fine particles not fused to the film, and the step of forming a water-repellent, oil-repellent and anti-fouling film.

10 Claims, 3 Drawing Sheets

(51) Int. Cl.
  *B05D 5/08* (2006.01)
  *H01B 19/04* (2006.01)
  *H02G 7/16* (2006.01)

(56) References Cited

U.S. PATENT DOCUMENTS

| | | | |
|---|---|---|---|
| 5,437,894 A * | 8/1995 | Ogawa et al. | 427/535 |
| 6,337,129 B1 * | 1/2002 | Watanabe et al. | 428/328 |
| 6,872,441 B2 * | 3/2005 | Baumann et al. | 428/142 |
| 7,635,522 B2 * | 12/2009 | Cnossen et al. | 428/447 |
| 7,959,826 B2 | 6/2011 | Gallagher et al. | |
| 7,985,475 B2 | 7/2011 | Dubrow | |
| 2001/0005531 A1 | 6/2001 | Ogawa | |
| 2001/0051273 A1 | 12/2001 | Veerasamy | |
| 2002/0045010 A1 | 4/2002 | Rohrbaugh et al. | |
| 2002/0192385 A1 | 12/2002 | Jenkner et al. | |
| 2005/0136180 A1 | 6/2005 | Pellerite et al. | |
| 2006/0154048 A1 * | 7/2006 | Teranishi et al. | 428/323 |
| 2010/0119774 A1 * | 5/2010 | Ogawa | 428/142 |
| 2010/0167067 A1 | 7/2010 | Hung | |
| 2010/0212736 A1 * | 8/2010 | Ogawa | 136/256 |
| 2010/0330373 A1 * | 12/2010 | Ogawa | 428/417 |
| 2012/0027995 A1 * | 2/2012 | Hung | 428/143 |

FOREIGN PATENT DOCUMENTS

| | | | |
|---|---|---|---|
| JP | H02-258032 A | | 10/1990 |
| JP | H08-195126 A | | 7/1996 |
| JP | 11-171592 | | 6/1999 |
| JP | 11171592 A | * | 6/1999 |
| JP | 2006-067834 A | | 3/2006 |
| JP | 2006-181486 | | 7/2006 |
| WO | WO-98/42452 A1 | | 10/1998 |
| WO | WO-01/14497 A1 | | 3/2001 |
| WO | WO 2004/052640 | | 6/2004 |
| WO | WO-2004/090065 A1 | | 10/2004 |
| WO | WO-2005/021843 A1 | | 3/2005 |
| WO | WO-2005/068400 A1 | | 7/2005 |

OTHER PUBLICATIONS

Written Opinion for PCT/JP2008/058783 mailed Aug. 19, 2008.
"Self-assembled monolayer", Wikipedia, 10 pp., accessed at http://en.wikipedia.org/wiki/Self-assembled_monolayer.
International Preliminary Report on Patentability for PCT/JP2008/058780 mailed on Jan. 21, 2010 (English translation included), 13 pp.
International Search Report for Intl. Pat. Application No. PCT/JP2008/058780, mailed on Aug. 19, 2008, 1 page.
Yeo, L., "Wetting and Spreading", pp. 2186-2196, accessed at http://users.monash.edu.au/~lyeo/Dr_Leslie_Yeo/Publications_files/Wetting&Spreading_Encyclopedia%20of%20Microfluidics%20and%20Nanofluidics.pdf.
International Preliminary Report on Patentability for PCT/JP2008/058783 mailed Jan. 21, 2010 (English translation).
Non-Final Office Action recieved for U.S. Appl. No. 12/600,144 dated Jun. 27, 2013.
Final Office Action in U.S. Appl. No. 12/600,144 dtd Jan. 6, 2014 (11 pages).
Notice of Allowance in U.S. Appl. No. 12/600,144 dtd Jun. 24, 2014 (11 pages).
Yuce, et al., "Tuning the Surface Hydrophobicity of Polymer/Nanoparticle Composite Films in the Wenzel Regime by Composition," Langmuir, vol. 21 No. 11, pp. 5073-5078, 2005.

* cited by examiner

ICING AND SNOW ACCRETION PREVENTIVE INSULATOR, ELECTRIC WIRE, AND ANTENNA, METHOD FOR MANUFACTURING THEM, AND TRANSMISSION LINE TOWER USING THEM

CROSS-REFERENCE TO RELATED APPLICATIONS

The present application is a U.S. national stage application under 35 U.S.C. §371 of International Application No. PCT/JP2008/058783, filed on May 13, 2008, which claims the benefit of Japanese Application No. 2007-127573, filed on May 14, 2007, the entire contents of which are incorporated herein by reference in their entireties.

TECHNICAL FIELD

The present invention relates to an icing and snow accretion preventive insulator, electric wire, and antenna in which a water-repellent, oil-repellent, and antifouling coating film having a high durability is provided on the surfaces thereof. Furthermore, the present invention relates to a transmission line tower using them.

BACKGROUND ART

In general, it is well known that a water-repellent, oil-repellent, and antifouling chemically adsorbed film can be formed in the form of a monomolecular film by chemisorption in a liquid phase using a chemical adsorption solution composed of a fluorocarbon group-containing chlorosilane based adsorbent and a nonaqueous organic solvent (for example, see Patent Document 1).

The principle of manufacturing such a chemically adsorbed monomolecular film in a solution lies in the formation of a monomolecular film using a dehydrochlorination reaction between active hydrogen such as a hydroxyl group on a surface of a base material and a chlorosilyl group of a chlorosilane based adsorbent.

Patent Document 1: Japanese Unexamined Patent Application Publication No. 02-258032

DISCLOSURE OF INVENTION

Problems to be Solved by the Invention

However, conventional chemically adsorbed films utilize only a chemical bond between an adsorbent and a surface of a flat base material, and thus the contact angle of water droplet is at most about 120 degrees. From the standpoint of naturally removing the water droplets and fouling, as with a lotus leaf, the conventional chemically adsorbed films had problems that their water-repellent, oil-repellent, and antifouling properties, water separation performance, and performance for preventing icing and snow accretion were poor. In addition, the conventional chemically adsorbed films had problems that durability such as wear resistance and weather resistance was also poor.

In view of the above current situation, in an insulator, electric wire, antenna, and a transmission line tower using them for which a high durability and an advanced function of prevention of icing and snow accretion are desired, it is an object of the present invention to provide an insulator, electric wire, and antenna that can realize a surface having a surface energy of 2 mN/m or less and has an increased effectiveness of prevention of icing and snow accretion in midwinter.

In the case where the above physical property value can be realized, it is applicable to, for example, a prevention of icing and snow accretion on various types of weather observation instruments such as rain gauges, a prevention of icing accretion on a dispensing portion of a liquid nitrogen tank or a liquid oxygen tank, and a prevention of icing accretion on an external fuel tank of a space shuttle. Accordingly, it has a significant effectiveness for preventing matters caused by icing accretion.

Means for Solving the Problems

A first invention provided as means for solving the above problems is an icing and snow accretion preventive insulator, electric wire, and antenna wherein a surface of a base material is coated with water-repellent, oil-repellent, and antifouling fine particles and a water-repellent, oil-repellent, and antifouling coating film that are fused to the surface of the base material directly or through a coating film for fusing the fine particles.

A second invention is the icing and snow accretion preventive insulator, electric wire, and antenna, according to the first invention, wherein a part of the surface of each of the fused water-repellent, oil-repellent, and antifouling fine particles is coated with the water-repellent, oil-repellent, and antifouling coating film, and the other portion is fused to be fixed on the surface of the base material either directly or through the coating film for fusing the fine particles.

A third invention is the icing and snow accretion preventive insulator, electric wire, and antenna, according to the first invention, wherein a mixture of fine particles having different particle diameters is used as the water-repellent, oil-repellent, and antifouling fine particles.

A fourth invention is the icing and snow accretion preventive insulator, electric wire, and antenna, according to any one of the first to third inventions, wherein at least the water-repellent, oil-repellent, and antifouling coating film is covalently bonded to the fine particles and the base material, or exposed portions of the fine particles and the coating film for fusing the fine particles.

A fifth invention is the icing and snow accretion preventive insulator, electric wire, and antenna, according to the fourth invention, wherein the water-repellent, oil-repellent, and antifouling coating film contains a —$CF_3$ group.

A sixth invention is the icing and snow accretion preventive insulator, electric wire, and antenna, according to any one of the first to fifth inventions, wherein the fine particles are made of a resin, metal, or ceramic having a softening temperature higher than the softening temperature of the base material or the softening temperature of the coating film for fusing the fine particles.

A seventh invention is the icing and snow accretion preventive insulator, electric wire, and antenna, according to any one of the first to sixth inventions, wherein the contact angle of water on the surface is controlled to be 130 degrees or more.

An eighth invention is the icing and snow accretion preventive insulator, electric wire, and antenna, according to any one of the first to seventh inventions, wherein the coating film for fusing the fine particles is composed of a resin film, a silica glass film, or a glaze film.

A ninth invention is the icing and snow accretion preventive insulator, electric wire, and antenna, according to any one of the first to eighth inventions, wherein the base material is made of a ceramic, copper, or aluminum.

A tenth invention is a transmission line tower equipped with the icing and snow accretion preventive insulator, electric wire, and antenna according to any one of the first to ninth inventions.

An eleventh invention is a method for manufacturing an icing and snow accretion preventive insulator, electric wire, and antenna including at least the step of forming a coating film for fusing fine particles onto a surface of a base material; the step of applying and drying a fine particle solution prepared by dispersing the fine particles in a solvent that does not dissolve the coating film; the step of firing; the step of removing fine particles that have not fused onto the coating film by washing; and the step of forming a water-repellent, oil-repellent, and antifouling coating film.

A twelfth invention is the method for manufacturing an icing and snow accretion preventive insulator, electric wire, and antenna, according to the eleventh invention, wherein a sol-gel method is used in the step of forming the coating film for fusing the fine particles.

A thirteenth invention is the method for manufacturing an icing and snow accretion preventive insulator, electric wire, and antenna, according to the eleventh or twelfth invention, wherein an atmosphere containing oxygen is used as the atmosphere during the firing, and the firing temperature is lower than both the softening temperature of the base material and the softening temperature of the fine particles.

A fourteenth invention is the method for manufacturing an icing and snow accretion preventive insulator, electric wire, and antenna, according to any one of the eleventh to thirteenth inventions, wherein the solvent that does not dissolve the coating film contains an organic solvent.

A fifteenth invention is the method for manufacturing an icing and snow accretion preventive insulator, electric wire, and antenna, according to any one of the eleventh to fourteenth inventions, wherein a ceramic, copper, or aluminum is used as the base material, a resin film or a silica glass film is used as the film for fusing the fine particles, and the fine particles are fused to the surface of the resin film or the silica glass film by heating.

A sixteenth invention is the method for manufacturing an icing and snow accretion preventive insulator, electric wire, and antenna, according to any one of the eleventh to fifteenth inventions, wherein the fine particles are fused to the surface of the resin film, the silica glass film, or the glaze film, by heating or firing in an atmosphere containing oxygen.

A seventeenth invention is a method for manufacturing an icing and snow accretion preventive insulator, electric wire, and antenna including at least the step of applying and drying a fine particle solution prepared by dispersing fine particles in a solvent onto a surface of a base material; the step of firing; the step of removing fine particles that have not fused onto the coating film by washing; and the step of forming a water-repellent, oil-repellent, and antifouling coating film.

An eighteenth invention is the method for manufacturing an icing and snow accretion preventive insulator, electric wire, and antenna, according to the seventeenth invention, wherein the heating temperature in the step of firing is equal to or higher than the softening temperature of the base material and lower than the softening temperature of the fine particles.

A nineteenth invention is the method for manufacturing an icing and snow accretion preventive insulator, electric wire, and antenna, according to any one of the eleventh to eighteenth inventions, wherein the surfaces of the fine particles used in the step of application are coated with an organic thin film.

A twentieth invention is the method for manufacturing an icing and snow accretion preventive insulator, electric wire, and antenna, according to any one of the eleventh to nineteenth inventions, wherein the step of forming a water-repellent, oil-repellent, and antifouling coating film includes a step of contacting a chemical adsorption solution and an icing and snow accretion preventive insulator, electric wire, and antenna on which the fine particles are fused to form the water-repellent, oil-repellent, and antifouling coating film, the chemical adsorption solution being prepared by mixing a chlorosilane compound having a fluorocarbon group and a trichlorosilyl group with a nonaqueous organic solvent, mixing an isocyanate compound having a fluorocarbon group and an isocyanate group with a nonaqueous organic solvent, or mixing an alkoxysilane compound having a fluorocarbon group and an alkoxysilyl group, a silanol condensation catalyst, and a nonaqueous organic solvent.

A twenty-first invention is the method for manufacturing an icing and snow accretion preventive insulator, electric wire, and antenna, according to any one of the eleventh to twentieth inventions, wherein the step of forming a water-repellent, oil-repellent, and antifouling coating film includes a step of removing excess chemical adsorption solution by washing after contact.

A twenty-second invention is the method for manufacturing an icing and snow accretion preventive insulator, electric wire, and antenna, according to any one of the eleventh to twenty-first inventions, wherein at least one selected from ketimine compounds, organic acids, metal oxides, aldimine compounds, enamine compounds, oxazolidine compounds, and aminoalkylalkoxysilane compounds as a cocatalyst is mixed with a silanol condensation catalyst for use.

More specifically, the present invention provides an icing and snow accretion preventive insulator, electric wire, and antenna wherein a surface of a base material is coated with fused water-repellent, oil-repellent, and antifouling fine particles and a water-repellent, oil-repellent, and antifouling coating film either directly or through a coating film for fusing the fine particles by at least a step of forming the coating film for fusing the fine particles on the surface of the base material, a step of applying and drying a fine particle solution prepared by dispersing the fine particles in a solvent that does not dissolve the coating film, a step of firing, a step of removing fine particles that have not fused onto the coating film by washing, and a step of forming the water-repellent, oil-repellent, and antifouling coating film.

Here, in the case where a part of the surface of each of the fused water-repellent, oil-repellent, and antifouling fine particles is coated with the water-repellent, oil-repellent, and antifouling coating film, and the other portion is fused to be fixed on the surface of the base material either directly or through the coating film for fusing the fine particles, it is appropriate for providing an icing and snow accretion preventive insulator, electric wire, and antenna having excellent durability.

In addition, in the case where a mixture of fine particles having different particle diameters is used as the water-repellent, oil-repellent, and antifouling fine particles, it is appropriate for increasing the effectiveness of prevention of icing and snow accretion.

Furthermore, in the case where at least the water-repellent, oil-repellent, and antifouling coating film is covalently bonded to the fine particles and the base material, or exposed portions of the fine particles and the coating film for fusing the fine particles, it is appropriate for providing an icing and snow accretion preventive insulator, electric wire, and antenna having excellent durability.

In addition, in the case where the water-repellent, oil-repellent, and antifouling coating film contains a —$CF_3$ group, it is appropriate for increasing the effectiveness of prevention of icing and snow accretion.

Furthermore, in the case where the fine particles are made of a resin, metal, or ceramic having a softening temperature higher than the softening temperature of the base material or the softening temperature of the coating film for fusing the fine particles, it is appropriate in terms of production because the shape of the fine particles is not impaired during a step of heating.

In addition, in the case where the contact angle of water on the surface is controlled to be 130 degrees or more, it is appropriate because an insulator, electric wire, and antenna having excellent effectiveness of prevention of icing and snow accretion can be provided.

In addition, the coating film for fusing the fine particles is preferably composed of a resin film, a silica glass film, or a glaze film. This is advantageous from the standpoint of fixing the fine particles.

In addition, in the case where the base material is made of a ceramic, copper, or aluminum, it is appropriate for the insulator, the electric wire, or the antenna.

Furthermore, in the case where the above icing and snow accretion preventive insulator, electric wire, and antenna are attached to a transmission line tower, it is appropriate for reducing a snow damage.

In this case, a sol-gel method is preferably used in the step of forming the coating film for fusing the fine particles. This method is advantageous from the standpoint of fixing the fine particles.

In addition, in the case where an atmosphere containing oxygen is used as the atmosphere during the firing, and the firing temperature is preferably lower than both the softening temperature of the base material and the softening temperature of the fine particles, it is appropriate because an icing and snow accretion preventive insulator, electric wire, and antenna having a high durability can be manufactured.

In addition, the solvent that does not dissolve the coating film preferably contains an organic solvent. This is advantageous from the standpoint of simplifying the process.

Furthermore, in the case where a ceramic, copper, or aluminum is used as the base material, a resin film or a silica glass film is used as the film for fusing the fine particles, and the fine particles are fused to the surface of the resin film or the silica glass film by heating, it is appropriate because a coating film having a high durability can be formed.

In addition, the fine particles are preferably fused to the surface of the resin film, the silica glass film, or the glaze film by heating or firing in an atmosphere containing oxygen. This is advantageous from the standpoint that a coating film having a high durability is formed.

In addition, a method for manufacturing an icing and snow accretion preventive insulator, electric wire, and antenna preferably includes at least the step of applying and drying a fine particle solution prepared by dispersing fine particles in a solvent onto a surface of a base material; the step of firing; the step of removing fine particles that have not fused onto the coating film by washing; and the step of forming a water-repellent, oil-repellent, and antifouling coating film. This method is advantageous from the standpoint that an insulator, electric wire, and antenna having an increased effectiveness of prevention of icing and snow accretion are manufactured.

In addition, the heating temperature in the step of firing is preferably equal to or higher than the softening temperature of the base material and lower than the softening temperature of the fine particles. This is advantageous from the standpoint that a coating film having a high durability is formed.

Furthermore, in the case where the surfaces of the fine particles used in the step of application are coated with an organic thin film, it is appropriate for improving the dispersibility of the fine particles.

In addition, the step of forming a water-repellent, oil-repellent, and antifouling coating film preferably includes a step of contacting a chemical adsorption solution and an icing and snow accretion preventive insulator, electric wire, and antenna on which the fine particles are fused to form the water-repellent, oil-repellent, and antifouling coating film, the chemical adsorption solution being prepared by mixing a chlorosilane compound having a fluorocarbon group and a trichlorosilyl group with a nonaqueous organic solvent, mixing an isocyanate compound having a fluorocarbon group and an isocyanate group with a nonaqueous organic solvent, or mixing an alkoxysilane compound having a fluorocarbon group and an alkoxysilyl group, a silanol condensation catalyst, and a nonaqueous organic solvent. This method is advantageous from the standpoint that an icing and snow accretion preventive monomolecular film is formed.

In addition, the step of forming a water-repellent, oil-repellent, and antifouling coating film preferably includes a step of removing excess chemical adsorption solution by washing after contact. This method is advantageous from the standpoint that an insulator, electric wire, and antenna having an increased effectiveness of prevention of icing and snow accretion are manufactured.

In addition, at least one selected from ketimine compounds, organic acids, metal oxides, aldimine compounds, enamine compounds, oxazolidine compounds, and aminoalkylalkoxysilane compounds as a cocatalyst is preferably mixed with a silanol condensation catalyst for use. This method is advantageous from the standpoint that the film formation time is reduced.

Advantages

As described above, the present invention can advantageously provide an icing and snow accretion preventive insulator, electric wire, and antenna which have a high water-repellent, oil-repellent, and antifouling performance, a high water separation performance, and a high performance for preventing icing and snow accretion, and a transmission line tower that uses them and is resistant to damage by snow.

BEST MODE FOR CARRYING OUT THE INVENTION

The present invention provides an icing and snow accretion preventive insulator, electric wire, and antenna in which a surface of a base material is coated with fused water-repellent, oil-repellent, and antifouling fine particles and a water-repellent, oil-repellent, and antifouling coating film either directly or through a coating film for fusing the fine particles, the insulator, electric wire, and antenna being manufactured by at least a step of forming a coating film for fusing the fine particles on the surface of the base material, a step of applying and drying a fine particle solution prepared by dispersing the fine particles in a solvent that does not dissolve the coating film, a step of firing, a step of removing fine particles that have not fused onto the coating film by washing, and a step of forming a water-repellent, oil-repellent, and antifouling coating film.

Consequently, the present invention has an effectiveness that can provide an excellent icing and snow accretion preventive insulator, electric wire, and antenna for which an icing and snow accretion preventive function is required. In addition, the present invention has an effectiveness that can provide a transmission line tower using them.

Details of the present invention will now be described using Examples, but the present invention is not limited to the Examples.

Note that the application of prevention of icing and snow accretion related to the present invention includes an insulator, an electric wire, and an antenna, but a description will be made using a ceramic insulator as a typical example below.

Example 1

A chemical agent having a fluorocarbon group (—$CF_3$) at one end thereof and an alkoxysilyl group at another end thereof, for example, represented by $CF_3(CF_2)_7(CH_2)_2Si(OCH_3)_3$ and dibutyltin diacetylacetonate as a silanol condensation catalyst were weighed in advance so that the ratio of the amount of chemical agent to the amount of silanol condensation catalyst was 99 weight percent to 1 weight percent. The chemical agent and the silanol condensation catalyst were dissolved in a silicone solvent, for example, a hexamethyldisiloxane solvent at a concentration of about 1 weight percent (a preferable concentration of a chemisorption agent was in the range of about 0.5% to 3%) to prepare a chemical adsorption solution.

Figure 1:
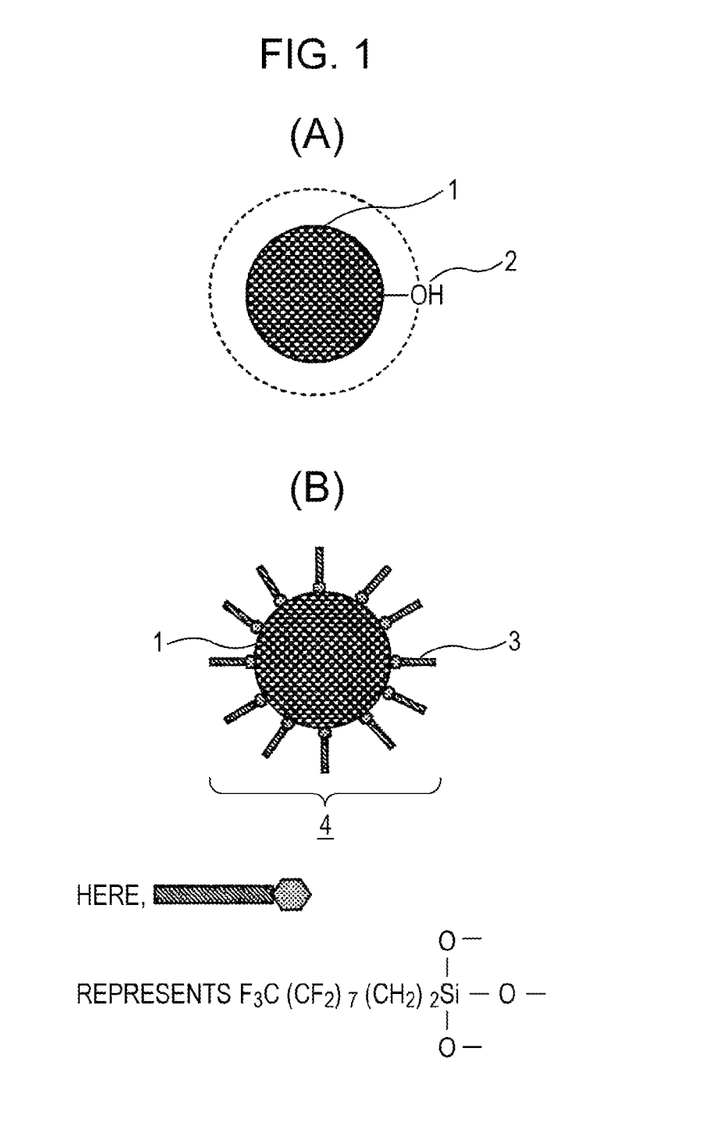
FIG. 1 includes conceptual views enlarged to the molecular level for illustrating a step of forming a fluorocarbon monomolecular film on the surface of a silica fine particle for the purpose of improving dispersibility in Example 1 of the present invention. (A) is a cross-sectional view of the silica fine particle before a reaction, and (B) is a view after a fluorocarbon group-containing monomolecular film is formed.

On the other hand, transparent silica fine particles 1 having a size of about 5 μm were prepared and sufficiently dried. (Alternatively, fine particles of alumina or zirconia may be used. In order to increase the effectiveness of prevention of icing and snow accretion, the size was preferably larger than the visible light wavelength (380 to 700 nm), and in order to increase the effectiveness of prevention of icing and snow accretion, the size was preferably small. Accordingly, the particle diameter was preferably in the range of 100 to 1 μm, and more preferably, in the range of 10 to 1 μm. No problems occurred when either particles having a spherical shape or particles having an irregular shape were used.) The silica fine particles 1 were then mixed with the above chemical adsorption solution. The mixture was allowed to react for about one hour under stirring in normal air (relative humidity of 45%). A large number of hydroxyl groups 2 are contained on the surface of each of the silica fine particles 1 (FIG. 1(A)). Accordingly, in this step, a —$Si(OCH_3)$ group of the chemisorption agent and the hydroxyl group 2 are subjected to a dealcoholization reaction (demethanol ($deCH_3OH$) in this case) in the presence of the silanol condensation catalyst to form a bond represented by chemical formula (Chemical Formula 2) below. Consequently, a chemisorption monomolecular film 3 containing a fluorocarbon group represented by formula (Chemical Formula 1) below and chemically bonded to the surface is formed over the entire surface of each of the silica fine particles 1 at a thickness of about 1 nm.

Subsequently, excess unreacted adsorption solution was removed by washing with a chlorinated solvent such as chloroform. Thereby, silica fine particles 4 coated with the fluorocarbon group-containing chemisorption monomolecular film that was chemically bonded to the entire surfaces thereof, and having an oil-repellent surface could be manufactured (FIG. 1(B)).

[Chemical Formula 1]

The resulting fine particles were dispersed in xylene which is an organic solvent in an amount of one weight percent to prepare a fine particle solution.

On the other hand, tetramethoxysilane ($Si(OCH_3)_4$) as an alkoxysilyl group-containing chemical agent to be silica glass after firing, for example, and dibutyltin diacetylacetonate as a silanol condensation catalyst, for example, were weighed so that the molar ratio of the alkoxysilyl group-containing chemical agent to the silanol condensation catalyst was 99:1. The chemical agent and the silanol condensation catalyst were dissolved in a silicone solvent, for example, a hexamethyldisiloxane solvent in a concentration of about 2 weight percent in total (a preferable concentration was in the range of about 0.5% to 3%) to prepare a silica application solution. Instead of the application solution, a commercially available chemical agent solution which is a silica sol solution of an alcohol solvent capable of forming a coating film for fusing the fine particles may be used. In addition, a low-melting-point solution containing phosphorus or boron is also commercially available.

Figure 2:
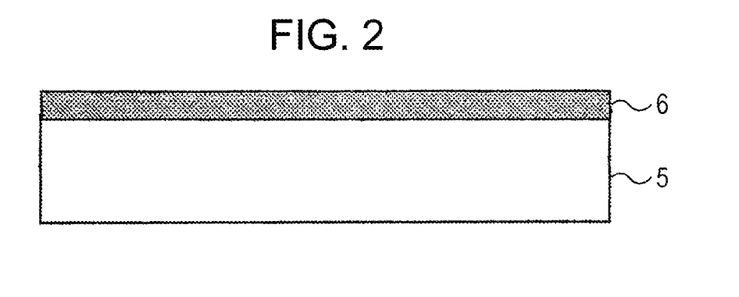
FIG. 2 is a cross-sectional view illustrating a state in which a coating film for fusing silica fine particles is formed on a surface of an insulator.

Subsequently, the silica application solution was applied onto a surface of an insulator 5 (a similar result was obtained when copper or aluminum was used) and the solvent was evaporated. Consequently, tetramethoxysilane was hydrolyzed and subjected to a dealcoholization reaction, thus forming a coating film 6 for fusing the silica fine particles, the coating film 6 having a thickness of about 500 nm and containing a large quantity of hydroxyl group (FIG. 2).

Figure 3:
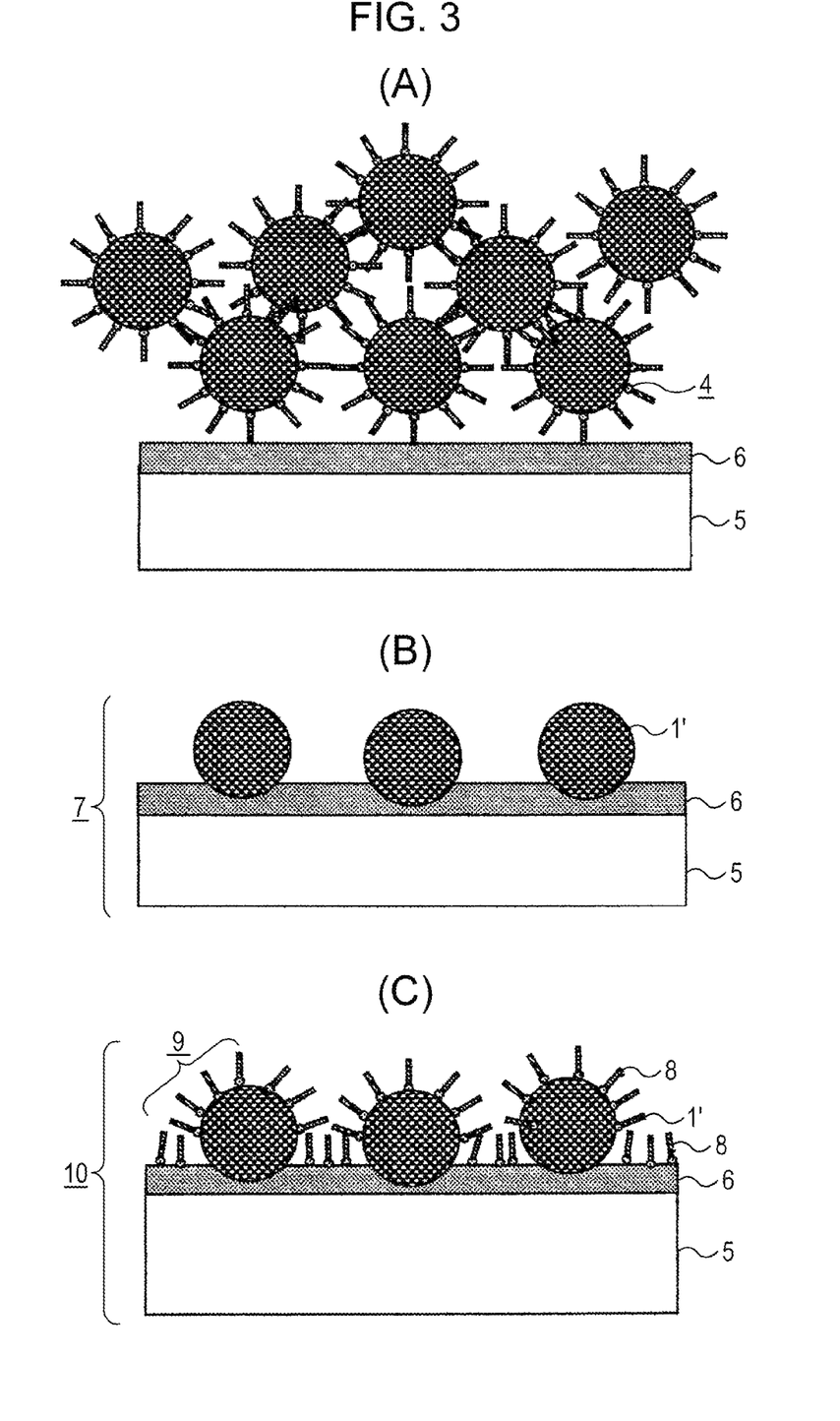
FIG. 3 includes conceptual views enlarged to the molecular level for illustrating a step of forming an oil-repellent and antifouling fluorocarbon monomolecular film on the surface of the insulator through a silica glass film functioning as a fusion film, in Example 1 of the present invention. (A) is a view showing a state in which a large number of silica fine particles coated with a fluorocarbon monomolecular film are disposed on a surface of a glass base material having a coating film for fusing the silica fine particles thereon. (B) is a view showing a state in which only one layer of fused silica fine particles is adhered by decomposing and removing the fluorocarbon monomolecular film on the surfaces of the silica fine particles by firing in an atmosphere containing oxygen, and by further removing excess silica fine particles by washing. (C) is a view showing a state in which a fluorocarbon monomolecular film is formed again over the entire surface.

Next, the above fine particle solution was applied onto the surface of this substrate, and the solvent was evaporated. Consequently, an insulator having a large number of the fine particles 4 coated with a monomolecular film thereon was manufactured (FIG. 3(A)).

Next, this insulator was fired in air containing oxygen at 500° C. for 30 minutes, and then washed with pure water. Consequently, the fluorocarbon group-containing chemisorption monomolecular film disposed on the surfaces of the fine particles was decomposed and removed, silica fine particles 1 that have not fused onto the silica glass film 6 were removed, and only silica fine particles 1' that were strongly fusion-bonded remained on the surface of the insulator in the form of a single layer (FIG. 3(B)).

Here, when the firing was performed at a firing temperature in the range of 250° C. to 350° C., the step of firing merely functioned as baking and densifying of the silica glass film. However, when the firing temperature exceeded 400° C., the monomolecular film could be completely decomposed and removed as described above, and the fine particles were fused.

In addition, when the firing temperature in an atmosphere containing oxygen was 250° C. or higher and lower than the softening temperature of the base material, the higher the firing temperature, the stronger the fine particles could be fused on the surface of the base material. However, when the firing temperature was excessively high, the silica fine particles were blended and buried in the coating film for fusing the silica fine particles or in the base material.

In this case, the fluorocarbon group-containing chemisorption monomolecular film disposed on the surfaces of the fine particles had a function of decreasing the surface energy of the silica fine particles and had an effectiveness of prevention of agglomeration in the fine particle solution and improvement of dispersibility. Although no serious problems occurred in the case where the fluorocarbon group-containing chemisorption monomolecular film was not formed on the surfaces of the fine particles, the defect density of the resulting film composed of the fused silica fine particles 1' was somewhat high.

Alternatively, in the case where the solvent of the fine particle solution was not an organic solvent such as xylene but an alcohol solvent or an aqueous solvent, the same function could be exhibited when, for example, a coating film represented by formula (Chemical Formula 2) below which was lipophilic but was water-repellent, oil-repellent, and antifouling was formed on the surfaces of the fine particles as the water-repellent, oil-repellent, and antifouling monomolecular film.

[Chemical Formula 2]

Furthermore, even when the coating film 6 for fusing the silica fine particles to be a binder layer was omitted in advance, the silica fine particles could be fused to be fixed on the surface of the base material at a heating temperature equal to or higher than the softening temperature of the base material. For example, in the case where an insulator coated with a glaze was used without further treatment, when the fine particles were applied and heating was then performed in air at 650° C. for 30 minutes, the silica fine particles could be fused to be fixed on the surface of the insulator.

In this case, the chemisorption monomolecular film provided on the surfaces of the silica fine particles was completely decomposed and removed. Since the melting point of the silica fine particles was much higher than 700° C., the silica fine particles were not fused to each other.

Furthermore, in the preparation of the silica application solution, when phosphoric acid or boric acid was added in an amount of several percent, phosphosilicate glass (PSG) or boron silicate glass (BSG) were formed. Therefore, in such a case, even when the firing temperature was decreased to 350° C. at the minimum, an icing and snow accretion preventive insulator having an equivalent surface roughness could be manufactured without impairing the strength.

Finally, the same fluorocarbon chemical adsorption solution as used in the above-described case of the fine particles was applied onto the surface of the resulting convex-concave base material 7, and a reaction was performed for about two hours. Excess unreacted adsorption solution was removed by washing with a chlorinated solvent such as chloroform. Consequently, a fluorocarbon group-containing chemisorption monomolecular film 8 that was chemically bonded to the surface could be formed over the entire surface of the convex-concave base material 7. Thus, an insulator 10 which was coated with fused water-repellent, oil-repellent, and antifouling fine particles 9 and the fluorocarbon group-containing water-repellent, oil-repellent, and antifouling coating film, for which a contact angle of a water droplet was about 140 degrees, and which had an increased effectiveness of prevention of icing and snow accretion can be manufactured (FIG. 3(C)).

In this case, when a mixture of fine particles having different sizes in the range of 100 to 1 μm was used, an insulator having a higher water-repellent, oil-repellent, and antifouling performance and a higher performance of prevention of icing and snow accretion could be obtained. In order to increase the effectiveness of prevention of icing and snow accretion, the size of the fine particles was preferably larger than the visible light wavelength (380 to 700 nm), and in order to increase the antifouling effect, the size of the fine particles was preferably small. Accordingly, the particle diameter was preferably in the range of 100 to 1 μm, and more preferably, in the range of 10 to 1 μm. No problems occurred when either particles having a spherical shape or particles having an irregular shape were used.

Here, the silica fine particles 1' on the surface of the insulator 5 were fused to be fixed on the surface of the insulator through the silica glass film 6. The exposed entire surfaces of the fused silica fine particles and the exposed entire surface of the coating film for fusing the silica fine particles were coated with the fluorocarbon group-containing water-repellent, oil-repellent, and antifouling coating film. Furthermore, the size of the silica fine particles 1 disposed on the surface was of a micron level, and the fluorocarbon group-containing chemisorption monomolecular film 8 had a thickness of about 1 nm. Accordingly, convex and concave surfaces of the convex-concave substrate were not destroyed at all, and ultra-water repellency in which the contact angle of a water droplet of about 140 degrees could be realized, in a manner similar to a lotus leaf.

Example 2

Figure 4:
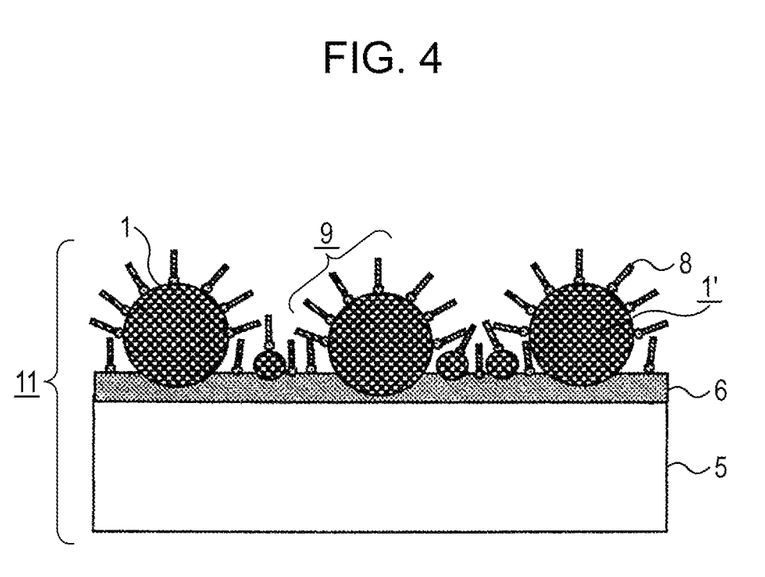
FIG. 4 is a conceptual view showing a cross-sectional state of an icing and snow accretion preventive insulator on which a water-repellent, oil-repellent, and antifouling film, which is prepared using a mixture of different types of fine particles and whose surface has a fractal structure, is provided.

On the other hand, an icing and snow accretion preventive insulator and electric wire were manufactured by the same method as described above using fine particles prepared by mixing fine particles having different sizes, for example, mixing fine particles having a size of about 5 μm with fine particles having a size of about 50 nm at a ratio of about 1:10. Consequently, a water-repellent, oil-repellent, and antifouling film whose surface had a fractal structure was formed, and thus, an insulator 11 for which a contact angle of a water droplet was about 155 degrees and which had an increased effectiveness of prevention of icing and snow accretion could be manufactured (FIG. 4).

As described above, when fine particles having a size in the range of about 500 to 10 nm were mixed with fine particles having a size in the range of 100 to 1 μm (for example, at a mixing ratio in the range of 1:10 to 50) and used, a surface roughness of an ideal fractal structure could be realized to further increase the effectiveness of prevention of icing and snow accretion. This advantage could be achieved as long as the fine particles to be added had a size in the range of 1,000 to 10 nm regardless of the shape of the fine particles, and an icing and snow accretion preventive insulator having a higher water-repellent, oil-repellent, and antifouling performance could be obtained.

In Examples 1 and 2, $CF_3(CF_2)_7(CH_2)_2Si(OCH_3)_3$ which is a fluorocarbon chemisorption agent was used as a chemical agent for forming the oil-repellent monomolecular film. In addition to the above chemical agent, substances represented by (1) to (12) below could also be used.

(1) $CF_3CH_2-O-(CH_2)_{15}Si(OCH_3)_3$
(2) $CF_3(CH_2)_3Si(CH_3)_2(CH_2)_{15}Si(OCH_3)_3$
(3) $CF_3(CF_2)_5(CH_2)_2Si(CH_3)_2(CH_2)_9Si(OCH_3)_3$
(4) $CF_3(CF_2)_7(CH_2)_2Si(CH_3)_2(CH_2)_9Si(OCH_3)_3$
(5) $CF_3COO(CH_2)_{15}Si(OCH_3)_3$
(6) $CF_3(CF_2)_5(CH_2)_2Si(OCH_3)_3$
(7) $CF_3CH_2O(CH_2)_{15}Si(OC_2H_5)_3$
(8) $CF_3(CH_2)_3Si(CH_3)_2(CH_2)_{15}Si(OC_2H_5)_3$
(9) $CF_3(CF_2)_5(CH_2)_2Si(CH_3)_2(CH_2)_9Si(OC_2H_5)_3$
(10) $CF_3(CF_2)_7(CH_2)_2Si(CH_3)_2(CH_2)_9Si(OC_2H_5)_3$
(11) $CF_3COO(CH_2)_{15}Si(OC_2H_5)_3$
(12) $CF_3(CF_2)_5(CH_2)_2Si(OC_2H_5)_3$

Furthermore, $CH_3(CH_2)_9Si(OCH_3)_3$ which is a hydrocarbon chemisorption agent could be used as a chemical agent that is used for the purpose of improving dispersibility of fine particles and is lipophilic but can decrease the surface energy compared with a silica film. In addition to the above chemical agent, substances represented by (21) to (32) below could also be used.

(21) $CH_3CH_2O(CH_2)_{15}Si(OCH_3)_3$
(22) $CH_3(CH_2)_3Si(CH_3)_2(CH_2)_{15}Si(OCH_3)_3$
(23) $CH_3(CH_2)_5(CH_2)_2Si(CH_3)_2(CH_2)_9Si(OCH_3)_3$
(24) $CH_3(CH_2)_9Si(CH_3)_2(CH_2)_9Si(OCH_3)_3$
(25) $CH_3COO(CH_2)_{15}Si(OCH_3)_3$
(26) $CH_3(CH_2)_7Si(OCH_3)_3$
(27) $CH_3CH_2O(CH_2)_{15}Si(OC_2H_5)_3$
(28) $CH_3(CH_2)_3Si(CH_3)_2(CH_2)_{15}Si(OC_2H_5)_3$
(29) $CH_3(CH_2)_7Si(CH_3)_2(CH_2)_9Si(OC_2H_5)_3$
(30) $CH_3(CH_2)_9Si(CH_3)_2(CH_2)_9Si(OC_2H_5)_3$
(31) $CH_3COO(CH_2)_{15}Si(OC_2H_5)_3$
(32) $CH_3(CH_2)_7Si(OC_2H_5)_3$

Furthermore, in Examples 1 and 2, as the silanol condensation catalyst, carboxylic acid metal salts, carboxylate metal salts, carboxylic acid metal salt polymers, carboxylic acid metal salt chelates, titanates, and titanate chelates can be used. More specifically, stannous acetate, dibutyltin dilaurate, dibutyltin dioctoate, dibutyltin diacetate, dioctyltin dilaurate, dioctyltin dioctoate, dioctyltin diacetate, stannous dioctoate, lead naphthenate, cobalt naphthenate, iron 2-ethylhexenoate, dioctyltin bisoctyl thioglycolate, dioctyltin maleate, dibutyltin maleate polymers, dimethyltin mercaptopropionate polymers, dibutyltin bisacetylacetate, dioctyltin bisacetyllaurate, tetrabutyl titanate, tetranonyl titanate, and bis(acetylacetonyl)dipropyl titanate could be used.

In Examples 1 and 2, in the case where a silanol condensation catalyst was not used, substances represented by (41) to (52) below could be used.

(41) $CF_3CH_2O(CH_2)_{15}SiCl_3$
(42) $CF_3(CH_2)_3Si(CH_3)_2(CH_2)_{15}SiCl_3$
(43) $CF_3(CF_2)_5(CH_2)_2Si(CH_3)_2(CH_2)_9SiCl_3$
(44) $CF_3(CF_2)_7(CH_2)_2Si(CH_3)_2(CH_2)_9SiCl_3$
(45) $CF_3COO(CH_2)_{15}SiCl_3$
(46) $CF_3(CF_2)_5(CH_2)_2Si(NCO)_3$
(47) $CF_3CH_2O(CH_2)_{15}Si(NCO)_3$
(48) $CF_3(CH_2)_3Si(CH_3)_2(CH_2)_{15}Si(NCO)_3$
(49) $CF_3(CF_2)_5(CH_2)_2Si(CH_3)_2(CH_2)_9Si(NCO)_3$
(50) $CF_3(CF_2)_7(CH_2)_2Si(CH_3)_2(CH_2)_9Si(NCO)_3$
(51) $CF_3COO(CH_2)_{15}Si(NCO)_3$
(52) $CF_3(CF_2)_5(CH_2)_2Si(NCO)_3$

Furthermore, as the solvent of the solution for forming a film, in both the case where the chemisorption agent was an alkoxysilane compound and the case where the chemisorption agent was a chlorosilane compound, organochlorine solvents, hydrocarbon solvents, fluorocarbon solvents, and silicone solvents, all of which did not contain water, and mixtures thereof could be used. When the particle concentration is increased by evaporating the solvent without performing washing, the boiling point of the solvent is preferably in the range of about 50° C. to 250° C.

In the case of a chlorosilane compound, specific examples of the solvents that can be used include nonaqueous petroleum naphtha, solvent naphtha, petroleum ether, petroleum benzine, isoparaffin, normal paraffin, decalin, industrial gasoline, nonanes, decanes, kerosene, dimethyl silicone, phenyl silicone, alkyl-modified silicone, polyether silicone, and dimethylformamide.

Furthermore, when the adsorbent was an alkoxysilane compound and an organic coating film was formed by evaporating a solvent, in addition to the above solvents, alcohol solvents such as methanol, ethanol, and propanols, and mixtures thereof could be used.

Examples of the fluorocarbon solvents include chlorofluorocarbon solvents, Fluorinert (a product available from 3M), and Aflude (a product available from Asahi Glass Co., Ltd.). These may be used alone or in combination of two or more solvents that can be sufficiently mixed with each other. Furthermore, an organochlorine solvent such as chloroform may be added to the solvent.

On the other hand, instead of the above-described silanol condensation catalyst, when a ketimine compound, an organic acid, a metal oxide such as $TiO_2$, an aldimine compound, an enamine compound, an oxazolidine compound, or an aminoalkylalkoxysilane compound was used at the same concentration, the processing time could be reduced to about ½ to ⅔.

Furthermore, when the silanol condensation catalyst is mixed with a ketimine compound, an organic acid, a metal oxide such as $TiO_2$, an aldimine compound, an enamine compound, an oxazolidine compound, or an aminoalkylalkoxysilane compound (the compounds can be used at a mixing ratio in the range of 1:9 to 9:1, but a ratio of about 1:1 is generally preferable) for use, the processing time can be further reduced several-folds, and thus, the reduced film formation time at a fraction of time can be realized.

For example, when dibutyltin oxide which is a silanol catalyst was replaced with H3, which is a ketimine compound manufactured by Japan Epoxy Resins Co., Ltd., and other conditions were the same, substantially the same results were obtained except that the reaction time could be reduced to about one hour.

Furthermore, when the silanol catalyst was replaced with a mixture (mixing ratio: 1:1) of H3, which is a ketimine compound manufactured by Japan Epoxy Resins Co., Ltd., and dibutyltin bisacetylacetonate which is a silanol catalyst and other conditions were the same, substantially the same results were obtained except that the reaction time could be reduced to about 20 minutes.

Accordingly, these results showed that the activities of ketimine compounds, organic acids, aldimine compounds, enamine compounds, oxazolidine compounds, and aminoalkylalkoxysilane compounds were higher than the activities of the silanol condensation catalyst.

Furthermore, it was confirmed that when one of ketimine compounds, organic acids, aldimine compounds, enamine compounds, oxazolidine compounds, and aminoalkylalkoxysilane compounds was mixed with the silanol condensation catalyst for use, the activity was further increased.

Examples of the ketimine compounds that can be used here include, but are not particularly limited to, 2,5,8-triaza-1,8-nonadiene, 3,11-dimethyl-4,7,10-triaza-3,10-tridecadiene, 2,10-dimethyl-3,6,9-triaza-2,9-undecadiene, 2,4,12,14-tetramethyl-5,8,11-triaza-4,11-pentadecadiene, 2,4,15,17-tetramethyl-5,8,11,14-tetraaza-4,14-octadecadiene, and 2,4,20,22-tetramethyl-5,12,19-triaza-4,19-trieicosadiene.

Examples of the organic acids that can be used include, but are also not particularly limited to, formic acid, acetic acid, propionic acid, butyric acid, and malonic acid. These organic acids achieved substantially the same effects.

In the above-described two Examples, descriptions have been made using silica fine particles as an example. However, in the present invention, any fine particles can be selected as long as an active hydrogen atom, namely, for example, a hydrogen atom of a hydroxyl group or a hydrogen atom of an amino group or an imino group is contained on the surfaces of the fine particles.

Specifically, when the base material was made of a ceramic or a metal, various types of low-melting-point resins or a silica coating film formed by a sol-gel method could be used as the coating film for fusing the fine particles, and resin fine particles, glass fine particles, alumina fine particles, zirconia fine particles, metal fine particles, and mica fine particles, all of which have a melting point higher than the above resin constituting the coating film for fusing the fine particles could be used as the fine particles.

For example, even when nylon fine particles which are resin fine particles having hydrophilic surfaces were used, a similar icing and snow accretion preventive insulator and electric wire could be manufactured by using, for example, a vinyl acetate resin having a melting point lower than that of the nylon fine particles as the coating film for fusing the fine particles and an alcohol that does not dissolve the base material or the fine particles as a solvent.

Furthermore, when the base material was made of a metal or a ceramic, various types of low-melting-point resins, a silica coating film formed by a sol-gel method, or a glaze film could be used as the coating film for fusing the fine particles, and resin fine particles, glass fine particles, alumina fine particles, zirconia fine particles, metal fine particles, and mica fine particles, all of which have a melting point higher than the above resin constituting the coating film for fusing the fine particles, could be used as the fine particles.

In a stainless component of a weather observation instrument such as a rain gauge, the effectiveness of icing and snow accretion could be markedly improved by the same process.

Furthermore, when the base material was made of glass, a metal, or a ceramic, a silica coating film formed by a sol-gel method or a glaze film could be used as the coating film for fusing the fine particles, and coloring could be performed so as to have a desired pattern by mixing a pigment, metal fine particles, or mica fine particles.

Example 3

An icing and snow accretion preventive insulator and electric wire which were prepared under the same conditions as the icing and snow accretion preventive insulator prepared in Example 2 and for which a contact angle of a water droplet was about 150 degrees (the higher the contact angle of a water droplet, the higher the antifouling performance, but, in view of practical use, a similar effect could be obtained when the contact angle of a water droplet was 130 degrees or more) were placed in contact with a freezer to examine the effectiveness of icing accretion. Large ice crystals negligibly accreted. This result shows that when the insulator and electric wire of the present invention are installed in a transmission line tower, snow damage can be significantly decreased.

In the case where the above physical property value can be realized, the technique can be used for, for example, prevention of icing and snow accretion on various types of weather observation instruments such as rain gauges, prevention of icing accretion on a dispensing portion of a liquid nitrogen tank or a liquid oxygen tank, and prevention of icing accretion on an external fuel tank of a space shuttle. Accordingly, a significant effectiveness of prevention of matters caused by icing accretion can be achieved.

REFERENCE NUMERALS 1 silica fine particles
1' fused silica fine particles
2 hydroxyl group
3 amino group
4 silica fine particles coated with a water-repellent, oil-repellent, and antifouling chemisorption monomolecular film
5 insulator
6 coating film for fusing the silica fine particles
7 insulator having a convex-concave surface on which fine particles are fused
8 fluorocarbon group-containing chemisorption monomolecular film
9 water-repellent, oil-repellent, and antifouling fine particle
10 insulator having an increased effectiveness of prevention of icing and snow accretion
11 insulator which has an increased effectiveness of prevention of icing and snow accretion and whose surface has a fractal structure

The invention claimed is:

1. An icing and snow accretion preventive system comprising:
an insulator composed at least in part of a base material;
an electric wire; and
an antenna;
wherein a surface of the base material is coated with:
water-repellent, oil-repellent, and antifouling first fine particles and water-repellent, oil-repellent, and antifouling second fine particles, wherein the first fine particles and the second fine particles are fused to the base material, wherein the first fine particles are larger than the second fine particles, and wherein a first portion of the surface of each of the first fine particles and the second fine particles are fused to be fixed on the surface of the base material, and a water-repellent, oil-repellent, and antifouling coating film coating the first fine particles, the second fine particles, and the base material.

2. The icing and snow accretion preventive system according to claim 1, wherein a second portion, different from the first portion, of the surface of each of the fused water-repellent, oil-repellent, and antifouling first fine particles and second fine particles are coated with the water-repellent, oil-repellent, and antifouling coating film.

3. The icing and snow accretion preventive system according to claim 1, wherein the second fine particles have diameters between 10 and 500 nanometers and the first fine particles have diameters between 1 and 100 micrometers.

4. The icing and snow accretion preventive system according to claim 1, wherein molecules of the coating film are covalently bonded to each of the first fine particles, the second fine particles, and the base material.

5. The icing and snow accretion preventive system according to claim 4, wherein the water-repellent, oil-repellent, and antifouling coating film contains a —$CF_3$ group.

6. The icing and snow accretion preventive system according to claim 1, wherein the first fine particles and the second fine particles are made of a resin, metal, or ceramic having a softening temperature higher than the softening temperature of the base material or the softening temperature of a fusion film on the surface of the base material.

7. The icing and snow accretion preventive system according to claim 1, wherein a contact angle of water on the surface is controlled to be 150 degrees or more.

8. The icing and snow accretion preventive system according to claim 1, wherein a fusion film exists on the base material, the first fine particles and the second find particles are fused to the fusion film, and the fusion film is composed of a resin film, a silica glass film, or a glaze film.

9. The icing and snow accretion preventive system according to claim 1, wherein the first fine particles and the second fine particles are fused directly to the base material, and the base material is made of a ceramic, copper, or aluminum.

10. The icing and snow accretion preventive system according to claim 1, wherein the system comprises a transmission line tower.

* * * * *